US008751478B1

United States Patent
Ramajayam et al.

(10) Patent No.: US 8,751,478 B1
(45) Date of Patent: Jun. 10, 2014

(54) SYSTEMS AND METHODS FOR ASSOCIATING BRANDS WITH SEARCH QUERIES THAT PRODUCE SEARCH RESULTS WITH MALICIOUS WEBSITES

(75) Inventors: Kaushik Ramajayam, Santa Clara, CA (US); Chandrasekhar Cidambi, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 138 days.

(21) Appl. No.: 13/339,109

(22) Filed: Dec. 28, 2011

(51) Int. Cl.
*G06F 17/30* (2006.01)

(52) U.S. Cl.
USPC .......................................... 707/708; 705/318

(58) Field of Classification Search
USPC ........................................ 707/708; 705/318
See application file for complete search history.

(56) References Cited

U.S. PATENT DOCUMENTS

| | | | |
|---|---|---|---|
| 2008/0301281 A1* | 12/2008 | Wang et al. | 709/224 |
| 2009/0024409 A1* | 1/2009 | Steelberg et al. | 705/1 |
| 2009/0070325 A1* | 3/2009 | Gabriel et al. | 707/5 |

OTHER PUBLICATIONS

Ma et al., Identifying Suspicious URLs, 2009.*
Website: http://www.ctoedge.com/content/whats-your-seo-poison, What's Your SEO Poison?, Mar. 20, 2010 (3 pgs.).
Website: http://www.ditti.com/2011/03/17/japan-earthquake-hit-by-seo-poisoning-fake-donation-website-and-emails/, Japan Earthquake Hit by SEO Poisoning, Fake Donation Websites and Emails, Mar. 17, 2011 (6 pgs.).

* cited by examiner

*Primary Examiner* — William Spieler
(74) *Attorney, Agent, or Firm* — Holland & Hart LLP

(57) ABSTRACT

A computer-implemented method to associate a brand with search queries that produce search results with malicious websites is described. A plurality of search queries entered into a search engine is received from a plurality of devices. commonalities among the plurality of search queries received from the plurality of devices are identified. The commonalities from the search queries are associated with a brand. A notification regarding the association of the commonalities from the search queries with the brand is generated.

15 Claims, 7 Drawing Sheets

SYSTEMS AND METHODS FOR ASSOCIATING BRANDS WITH SEARCH QUERIES THAT PRODUCE SEARCH RESULTS WITH MALICIOUS WEBSITES

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks. The productivity and efficiency of employees often require human and computer interaction. Users of computer technologies continue to demand an increase in the efficiency of these technologies. Improving the efficiency of computer technologies is desirable to anyone who uses and relies on computers.

Users of computer technologies continuously rely on the Internet to locate and access pertinent information. Various search engines have been developed that allow users to search for information on the Internet. Users may enter search terms or phrases into a field of a search engine. The search engine may provide search results include a list of websites that may include information relative to the search terms or phrases.

Owners of websites may desire to improve the visibility of their websites by "boosting" the placement of their websites to the top of the search results. This may improve the probability that a user will access their websites from the search results. Developers of malicious websites, however, may also desire to "boost" the placement of their malicious websites within the search results returned from search engines. This may cause unsuspecting users to access malicious websites. Once accessed, the malicious websites may damage the user's computer, modify or destroy data on the computer, exploit confidential data stored on the user's computer, and the like.

SUMMARY

According to at least one embodiment, a computer-implemented method to associate brands with search queries that produce search results with malicious websites is described. A plurality of search queries entered into a search engine is received from a plurality of devices. Commonalities among the plurality of search queries received from the plurality of devices are identified. The commonalities from the search queries are associated with a brand. A notification regarding the association of the commonalities from the search queries with the brand is generated.

In one embodiment, search results based on the plurality of search queries are received. The search results may include a list of at least one uniform resource locator (URL). The search results may be compared to a list of known malicious websites.

In one example, the plurality of search queries may be received over a pre-determined time period. The plurality of search queries may be received from the plurality of devices located in a pre-determined geographical location.

In one configuration, an owner of the brand may be identified. The notification may be transmitted to the identified owner of the brand. In one embodiment, a ranking may be assigned to each of the plurality of search queries based on a number of occurrences of the search queries.

A computing device configured to associate brands with search queries that produce search results with malicious websites is also described. The device including a processor and memory in electronic communication with the processor. The device may further include an association module stored in the memory and configured to receive a plurality of search queries entered into a search engine from a plurality of devices, and identify commonalities among the plurality of search queries received from the plurality of devices. The association module may be further configured to associate the commonalities from the search queries with a brand, and generate a notification regarding the association of the commonalities from the search queries with the brand.

A computer-program product for associating brands with search queries that produce search results with malicious websites is also described. The computer-program product comprising a non-transitory computer-readable medium having instructions thereon. The instructions including code programmed to receive a plurality of search queries entered into a search engine from a plurality of devices, and code programmed to identify commonalities among the plurality of search queries received from the plurality of devices. The instructions further including code programmed to associate the commonalities from the search queries with a brand, and code programmed to generate a notification regarding the association of the commonalities from the search queries with the brand.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
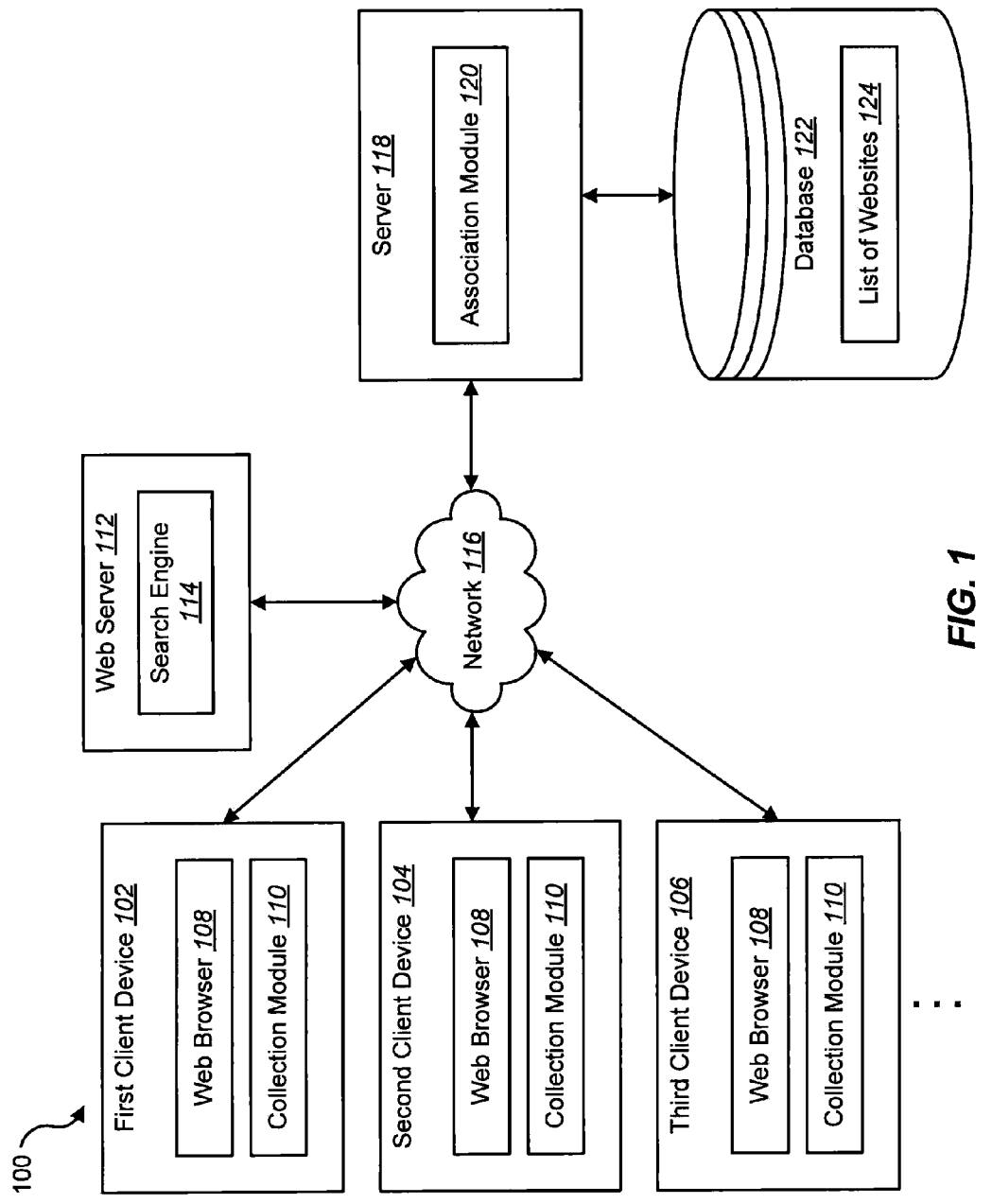
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Search engine optimization (SEO) is the process of improving the visibility of a listing for a website or a web page in search results provided by a search engine. The visibility may relate to the position of the listing of the website or the web page in the search results. For example, a first website that is listed earlier (or higher) in the search results than a second website may have a high probability of being selected by a user. In general, the earlier (or higher) the listing of a website appears in the search results, the greater the probability that the user will access the listing to visit the website.

In some cases, SEO may be used to increase the visibility of a listing of a malicious website or web page in the search results returned from a search engine. As a result, the probability increases that a user will access the listing of the malicious website from the search results. While the user visits the malicious website, the website may infect the user's computer by causing a virus to download on the user's machine, by causing spyware to install on the machine, and the like. Using SEO to place a malicious website listing higher in the search results may be referred to as SEO poisoning attacks. SEO poisoning attacks may cause a listing for a malicious website to appear among the first (or higher) listings in a search results list returned from a search engine. As stated above, users are more likely to click on listings that are higher up on the search results list.

Malicious and phishing website creators often use keywords associated with brands and current events to boost the placement of the listing of their malicious websites on search results lists. For example, the creator of the malicious website may include the keyword "Citibank" throughout the text included on the malicious website. When a user enters the keyword "Citibank" to a search engine (e.g., Google, Yahoo!, Bing, etc.) as a search query, the listing for the malicious website may be positioned among the first listing on the search results.

The probability that the user will access the malicious website increases because the listing of the malicious website is placed towards the top of the search results. Further, the owner of the brand "Citibank" may be unaware that their brand is being used to lead unsuspecting users (which may be customers and potential customers) to malicious websites.

Reliably predicting which brands will be targeted at a given time, and to what extent, is a continuous challenge. Further, it is difficult to identify the specific keywords that will be used to target users searching for a particular brand. Search engines are unable to react quickly to such threats, since they lack reliable and up-to-date information regarding brands that are currently being targeted by creators of malicious websites.

In one embodiment, the present systems and methods correlate data relating to search engine queries submitted by multiple users. In addition, the present systems and methods correlate data relating to the multiple search results that are generated from the search engine queries. This data may be correlated with known ratings for websites that indicate the maliciousness of each website. For example, using the ratings of the websites included in a search results list, malicious websites may be identified. The present systems and methods may generate a list of the common phrases among the search queries provided by multiple users that led to a listing of a malicious website being included in the multiple search results. In one configuration, the present systems and methods may analyze the common terms or phrases within this list to identify references to known brands (such as "ipad2 release date", "verizon data plan", "wal-mart locations", etc.). Based on the analysis, the present systems and methods may further generate a list of search queries associated with brands that have been hijacked to boost the popularity of malicious websites on the search results list.

In one example, search query data obtained from the multiple users may be aggregated over specific time intervals (for instance, every 24 hours). In addition, the search query data may be grouped by search engine, geographical location, and other attributes. The search query data are cross-referenced with a database of known malicious and phishing websites, to determine which search queries generated results that include listings for harmful websites. In one embodiment, these search queries may be ranked according to the number of occurrences from different users and search queries that include references to known brands or current events are identified. Further details regarding the present systems and methods are described below.

FIG. 1 is a block diagram illustrating one embodiment of an environment 100 in which the present systems and methods may be implemented. In one configuration, a first client device 102, a second client device 104, and a third client device 106 may communicate with a web server 112 and a server 118 across a network 116. The client devices 102, 104, 106 may be, but are not limited to, personal computers (PCs), tablets, laptops, personal digital assistants (PDAs), smartphones, or another type of computing device. While only three client devices 102, 104, 106 are illustrated, it is to be understood that more or less than three client devices 102, 104, 106 may be used with the present systems and methods.

In one embodiment, each client device 102, 104, 106 may include a web browser 108. The web browser 108 may be any type of browser, such as, but not limited to, Internet Explorer, Google Chrome, Safari, Firefox, and the like. The web browser 108 may access a website for a search engine 114 hosted by the web server 112. Examples of the search engine 114 may include, but are not limited to, Google, Yahoo!, Bing, and the like. A user may enter a search query via the web browser 108. The search engine 114 may receive the search query and return a list of websites that are associated with the entered search query. The user may then click on a listing of a website in the search results to access a website.

In one configuration, the client devices 102, 104, 106 may further include a collection module 110. The collection module 110 may collect various types of data. In one example, the collection module 110 may collect the search queries entered at the web browser 108 on each client device 102, 104, 106. In addition, the collection module 110 may collect the search results that are returned from the search engine 114 as a result of the search queries.

In one example, the server 118 may include an association module 120. The association module 120 may receive the data collected by the collection module 110 and perform an analysis of the data. The server 118 may be in communication with a database 122. The database 122 may include a list of websites 124 that includes data regarding the websites included in the list 124.

Figure 2:
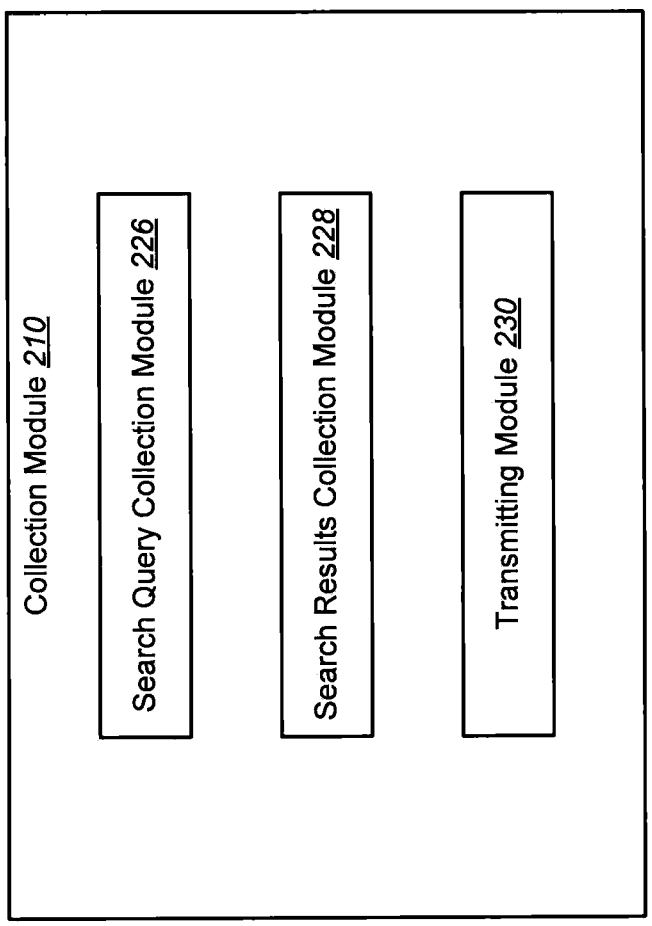
FIG. 2 is a block diagram illustrating one embodiment of a collection module in accordance with the present systems and methods.

FIG. 2 is a block diagram illustrating one embodiment of a collection module 210 in accordance with the present systems and methods. In one example, the collection module 210 may be located on the client devices 102, 104, 106. The module 210 may include a search query collection module 226, a search results collection module 228, and a transmitting module 230. In one embodiment, the search query collection module 226 may collect the phrases, keywords, etc. that make up a search query entered by a user at a web browser 108. The search results collection module 228 may collect the list of search results returned from a search engine 114 based on the search queries. In one example, the collection module 210 may be located on a plurality of client devices 102, 104, 106. As a result, the collection module 210 may facilitate the gathering of search queries entered by multiple users as well as the gathering of multiple lists of search results returned from the search engine 114 for the entered search queries. The transmitting module 230 may transmit the collected search queries and search results to a back-end server, such as the server 118.

Figure 3:
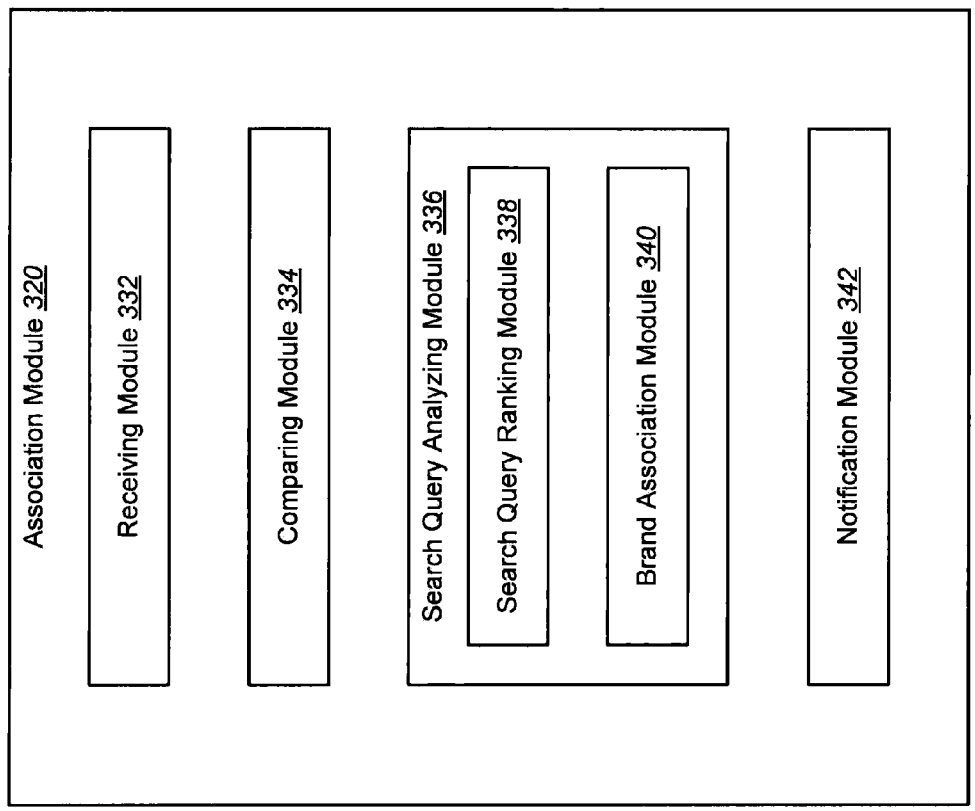
FIG. 3 is a block diagram illustrating one embodiment of an association module in accordance with the present systems and methods.

FIG. 3 is a block diagram illustrating one embodiment of an association module 320 in accordance with the present systems and methods. The association module 320 may be located on a back-end server, such as the server 118. In one configuration, the module 320 may include a receiving module 332 to receive transmitted search queries and search results that have been collected by the collection module 110 located on one or more client devices 102, 104, 106. The association module 320 may further include a comparing module 334. In one configuration, the comparing module 334 may compare the received search results with the list of websites 124 stored in the database 122. The list of websites 124 may be a list of uniform resource locators (URLs) of known or suspected malicious websites. The comparing module 334 may compare the URLs included in the search results with the URLs in the list of websites 124 stored in the database 122. The comparing module 334 may identify the URLs from the search results that match URLs from the list of websites 124 stored in the database 122.

The association module 320 may further include a search query analyzing module 336. The analyzing module 336 may analyze the received search queries received from the collection module 110. The search query analyzing module 336 may analyze the search queries that produced search results that include URLs of websites that match URLs of websites included in the list of websites 124 stored in the database 122. For example, the association module 320 may receive collected search queries and collected search results from ten client devices. Of these ten devices, three devices may have received search results with URLs of websites that match URLs included in the list of websites 124 that includes URLs of known malicious websites. The search query analyzing module 336 may analyze the search queries collected by these three client devices.

Following the above example, the analyzing module 336 may include a search query ranking module 338. The ranking module 338 may identify commonalities (e.g., common phrases, common keywords, etc.) that appear in the search queries collected from the three client devices that collected search results with URLs of known or suspicious websites. The commonalities that appear in the search queries associated with these three devices may be ranked based on the frequency of appearance in the search queries. A brand association module 340 may then analyze the commonalities, such as common phrases and common keywords, beginning with the highest ranked phrases and keywords (i.e., the phrases and keywords with the highest frequency of occurrence in the search queries collected from the three devices). The brand association module 340 may analyze these phrases and keywords to determine whether they match known brands. Known brands may include the name of an entity, the name of a product, a slogan of an entity or product, and the like. A notification module 342 may generate a notification for an owner of a brand if the brand association module 340 determines that phrases and keywords that include the brand produce search results that include known or suspicious websites.

In one embodiment, the search query analyzing module 336 may analyze a specific brand. For example, an owner of a brand may request the module 336 to search collected search queries for a particular brand to determine whether that brand is being used on SEO poisoning attacks. If the analyzing module 336 identifies the particular brand in search queries that produced search results with known malicious or suspicious websites, the notification module 342 may generate a notification to the brand owner that the brand may be involved in an SEO poisoning attack.

Figure 4:
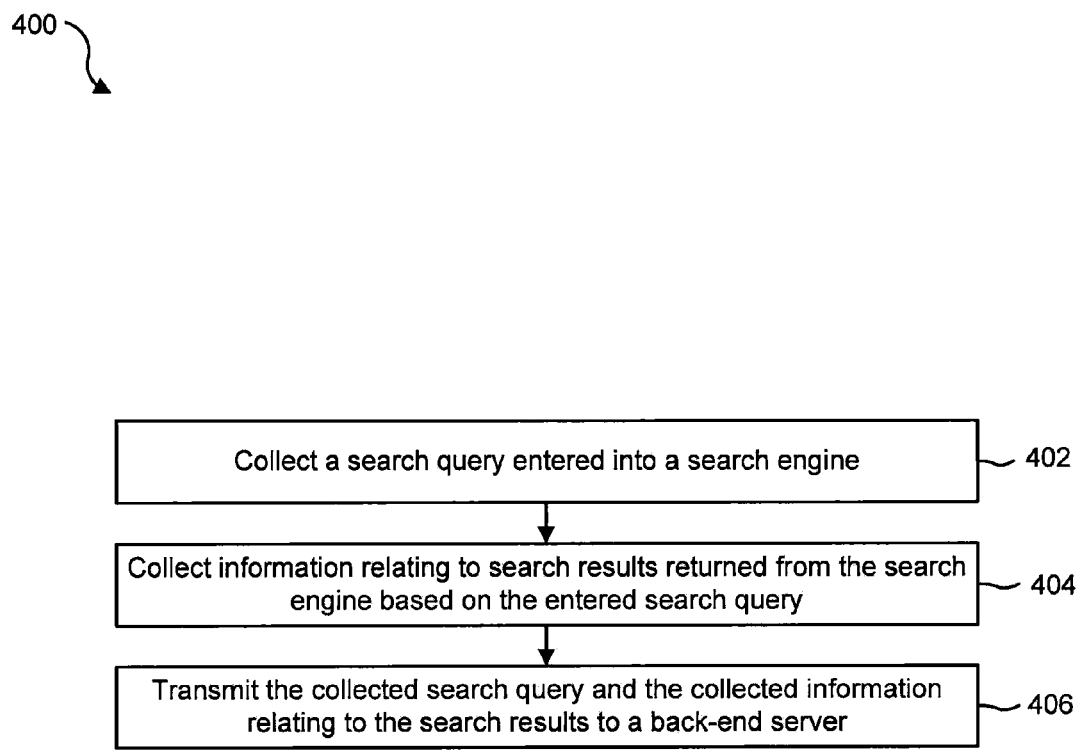
FIG. 4 is a flow chart illustrating one embodiment of a method to collect data relating to possible search engine optimization (SEO) poisoning attacks.

FIG. 4 is a flow chart illustrating one embodiment of a method 400 to collect data relating to possible SEO poisoning attacks. In one configuration, the method 400 may be implemented by the collection module 110.

In one example, a search query entered into the search engine 114 may be collected 402. The search query may be collected from a single client device 102 or from multiple client devices 102, 104, 106. In addition, the search query may be collected during a pre-defined time interval. For example, the collection module 110 may collect search queries that are entered into the search engine 114 over a 24-hour period. In addition, the collection module 110 may collect search queries that are entered into the search engine 114 via a client device that is located in a specified geological area. Further, the collection module 110 may collect search queries that are entered into a specific search engine (e.g., Google, Yahoo!, Bing, and the like).

In one configuration, information relating to search results returned from the search engine 114, based on the entered search query, may be collected 404. For example, URLs included in the search results may be collected 404. The collected search query and the collected information relating to the search results may be transmitted 406 to a back-end server 118, such as the server 118.

Figure 5:
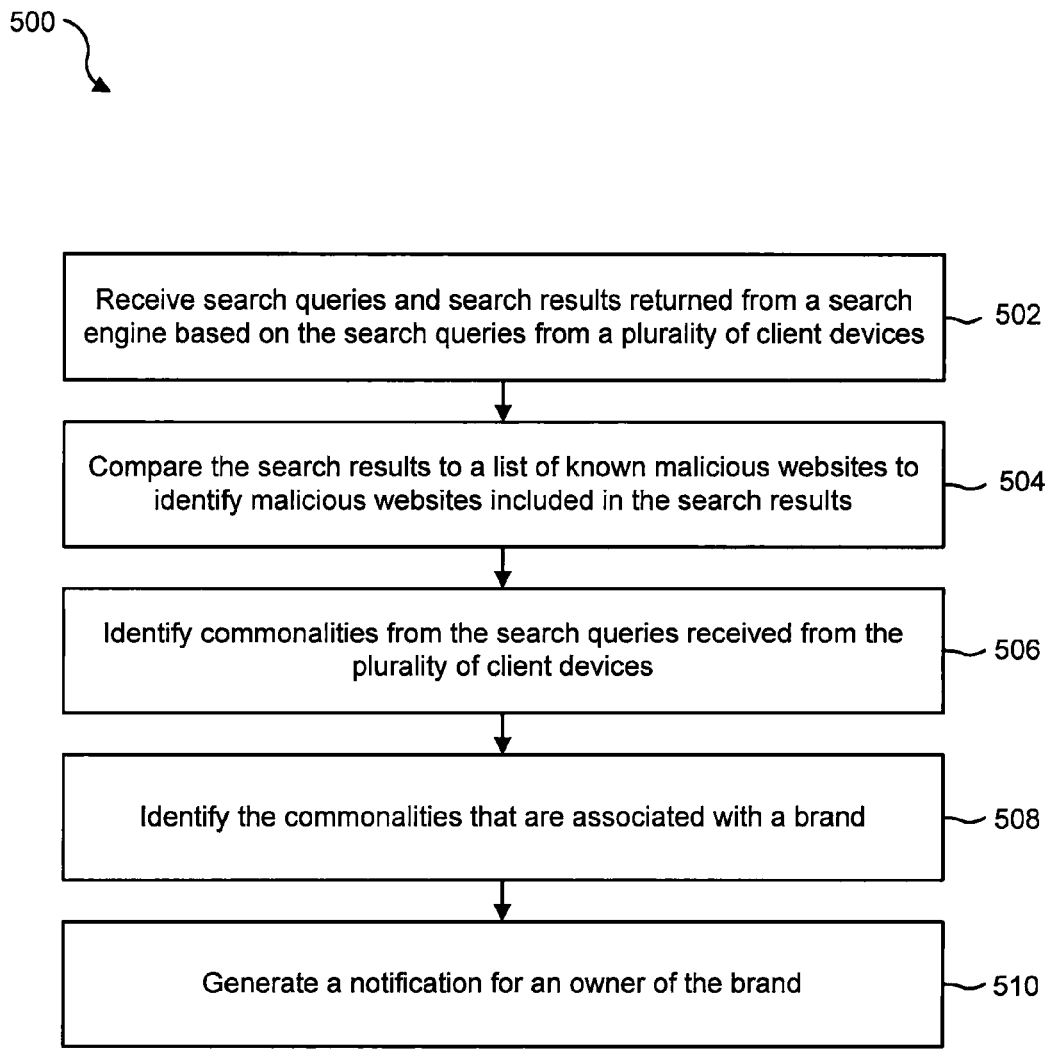
FIG. 5 is a flow chart illustrating one embodiment of a method to associate brands with search queries that produce search results with known malicious or suspicious websites.

FIG. 5 is a flow chart illustrating one embodiment of a method 500 to associate brands with search queries that produce search results with known malicious or suspicious websites. In one embodiment, the method 500 may be implemented by the association module 120.

In one example, search queries and search results returned from search engines may be received 502 from a plurality of client devices. For example, users of the client devices may enter search queries into a search engine on a web browser. The search engine may return search results via the web browser. Information in the search results may be compared 504 to a list of known malicious or suspicious websites. Malicious websites included in the search results may be identified based on the comparison. The information that may be compared to the list may include a URL of a website included in the search results. In one example, search queries that produced search results with identified malicious websites may be identified and commonalities (e.g., common phrases, common keywords, etc.) from these identified search queries may be identified 506. In addition, the commonalities that are associated with a known brand may further be identified 508. In one embodiment, a notification may be generated 510 for an owner of the known brand. The notification may inform the owner that words or phrases representing the known brand may be producing search results that include malicious websites.

Figure 6:
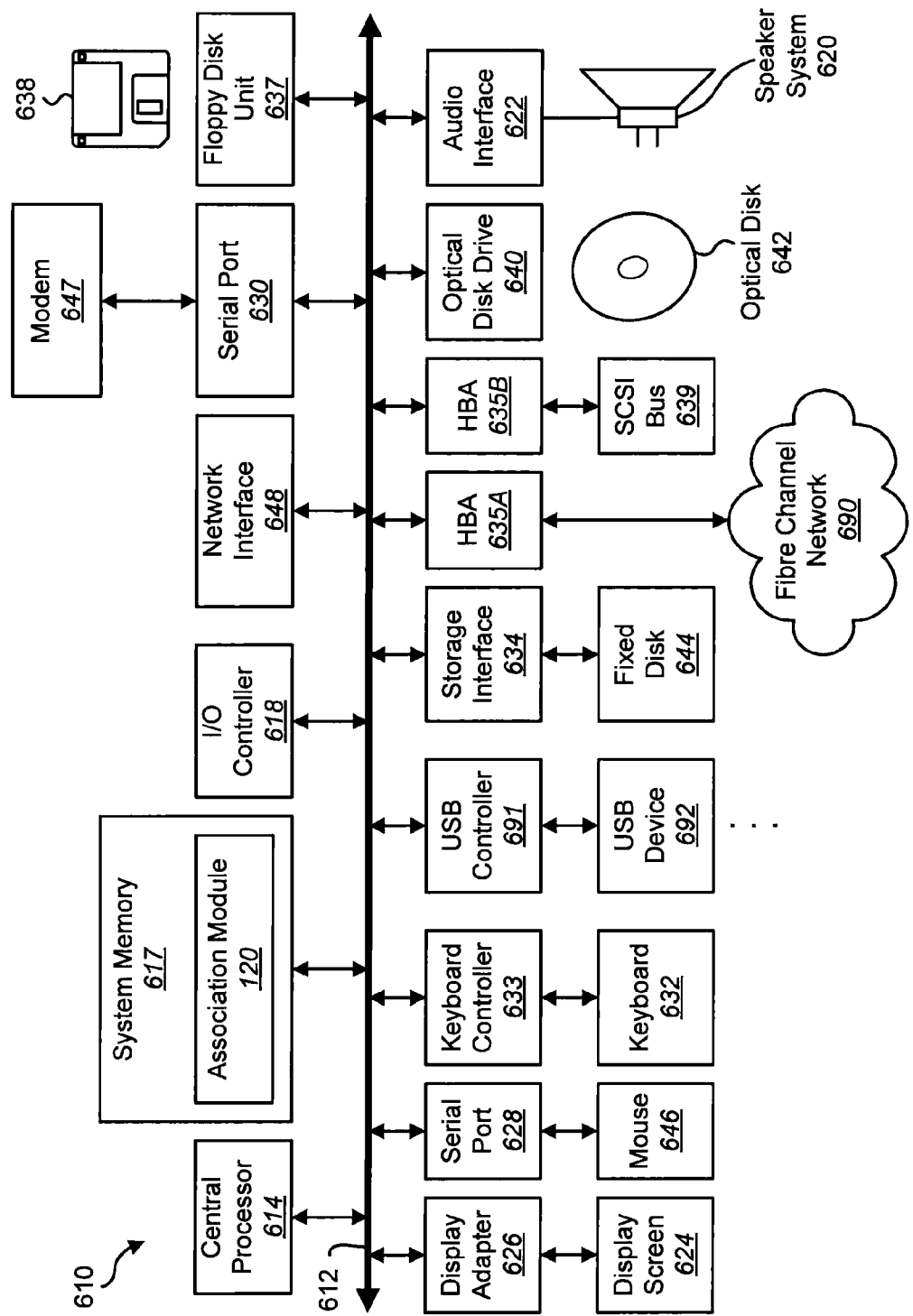
FIG. 6 depicts a block diagram of a computer system suitable for implementing the present systems and methods.

FIG. 6 depicts a block diagram of a computer system 610 suitable for implementing the present systems and methods. Computer system 610 includes a bus 612 which interconnects major subsystems of computer system 610, such as a central processor 614, a system memory 617 (typically RAM, but which may also include ROM, flash RAM, or the like), an input/output controller 618, an external audio device, such as a speaker system 620 via an audio output interface 622, an external device, such as a display screen 624 via display adapter 626, serial ports 628 and 630, a keyboard 632 (interfaced with a keyboard controller 633), multiple USB devices 692 (interfaced with a USB controller 691), a storage interface 634, a floppy disk unit 637 operative to receive a floppy disk 638, a host bus adapter (HBA) interface card 635A operative to connect with a Fibre Channel network 690, a host bus adapter (HBA) interface card 635B operative to connect to a SCSI bus 639, and an optical disk drive 640 operative to receive an optical disk 642. Also included are a mouse 646 (or other point-and-click device, coupled to bus 612 via serial port 628), a modem 647 (coupled to bus 612 via serial port 630), and a network interface 648 (coupled directly to bus 612).

Bus 612 allows data communication between central processor 614 and system memory 617, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the association module 120 to implement the present systems and methods may be stored within the system memory 617. Applications resident with computer system 610 are generally stored on and accessed via a non-transitory computer readable medium, such as a hard disk drive (e.g., fixed disk 644), an optical drive (e.g., optical drive 640), a floppy disk unit 637, or other storage medium. Additionally, applications can be in the form of electronic signals modulated in accordance with the application and data communication technology when accessed via network modem 647 or interface 648.

Storage interface 634, as with the other storage interfaces of computer system 610, can connect to a standard computer readable medium for storage and/or retrieval of information, such as a fixed disk drive 644. Fixed disk drive 644 may be a part of computer system 610 or may be separate and accessed through other interface systems. Modem 647 may provide a direct connection to a remote server via a telephone link or to the Internet via an internet service provider (ISP). Network interface 848 may provide a direct connection to a remote server via a direct network link to the Internet via a POP (point of presence). Network interface 648 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 6 need not be present to practice the present systems and methods. The devices and subsystems can be interconnected in different ways from that shown in FIG. 6. The operation of a computer system such as that shown in FIG. 6 is readily known in the art and is not discussed in detail in this application. Code to implement the present disclosure can be stored in a non-transitory computer-readable medium such as one or more of system memory 617, fixed disk 644, optical disk 642, or floppy disk 638. The operating system provided on computer system 610 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 7:
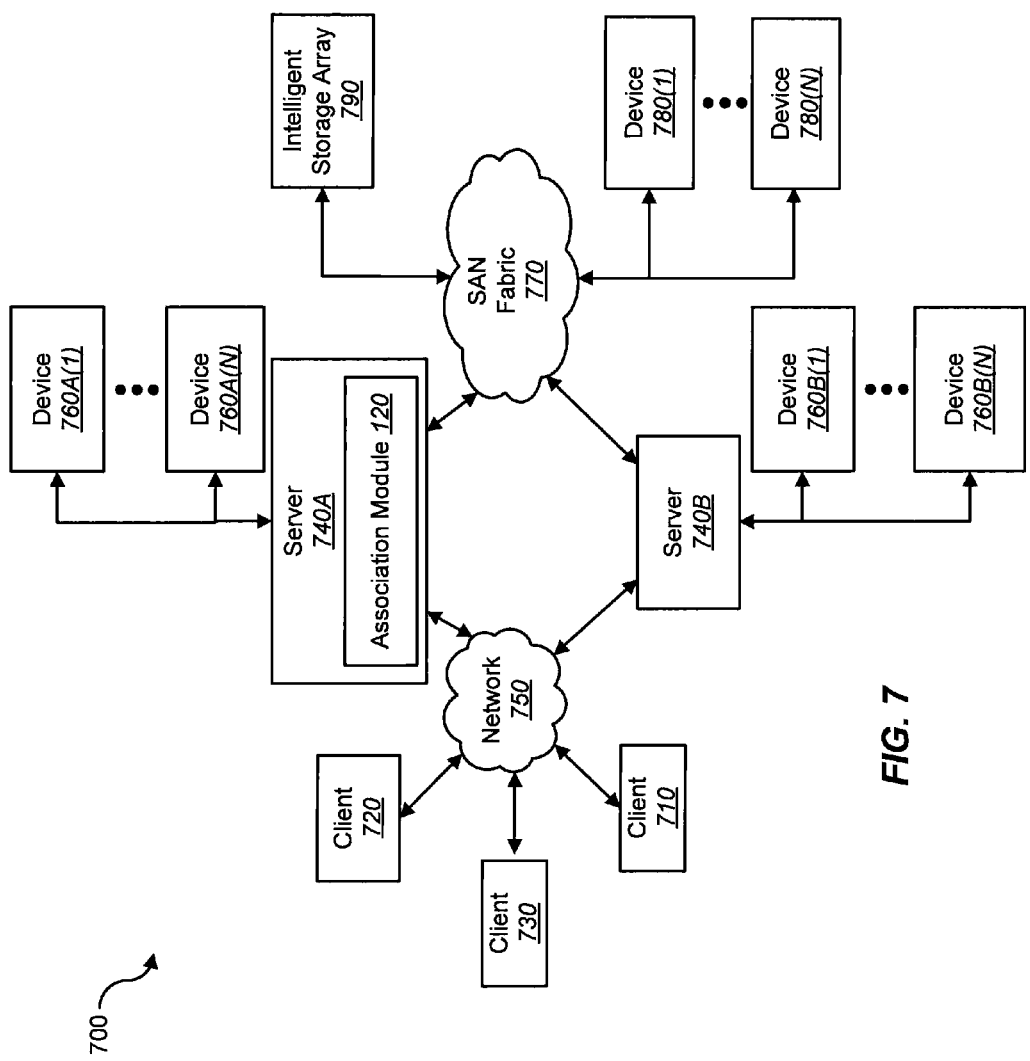
FIG. 7 is a block diagram depicting a network architecture in which client systems, as well as storage servers (any of which can be implemented using computer system), are coupled to a network.

FIG. 7 is a block diagram depicting a network architecture 700 in which client systems 710, 720 and 730, as well as storage servers 740A, 740B (any of which can be implemented using computer system 710), are coupled to a network 750. In one embodiment, the association module 120 may be located within the storage servers 740A, 740B to implement the present systems and methods. The storage server 740A is further depicted as having storage devices 760A(1)-(N) directly attached, and storage server 740B is depicted with storage devices 760B(1)-(N) directly attached. SAN fabric 770 supports access to storage devices 780(1)-(N) by storage servers 740A, 740B, and so by client systems 710, 720 and 730 via network 750. Intelligent storage array 790 is also shown as an example of a specific storage device accessible via SAN fabric 770.

With reference to computer system 610, modem 647, network interface 648 or some other method can be used to provide connectivity from each of client computer systems 710, 720, and 730 to network 750. Client systems 710, 720, and 730 are able to access information on storage server 740A or 740B using, for example, a web browser or other client software (not shown). Such a client allows client systems 710, 720, and 730 to access data hosted by storage server 740A or 740B or one of storage devices 760A(1)-(N), 760B(1)-(N), 780(1)-(N) or intelligent storage array 790. FIG. 7 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method to associate a brand with search queries that produce search results with malicious websites, comprising:
   receiving a plurality of search queries entered into a search engine from a plurality of devices;
   receiving, from the plurality of devices, search results produced from the plurality of search queries;
   comparing the search results to a list of known malicious websites in order to identify candidate search queries producing search results with malicious websites;
   identifying commonalities among the identified candidate search queries producing search results with malicious websites;
   associating the commonalities from the search queries with a brand; and
   generating a notification regarding the association of the commonalities from the search queries with the brand.

2. The method of claim 1, wherein the search results comprise a list of at least one uniform resource locator (URL).

3. The method of claim 1, further comprising receiving the plurality of search queries over a pre-determined time period.

4. The method of claim 1, further comprising receiving the plurality of search queries from the plurality of devices located in a pre-determined geographical location.

5. The method of claim 1, further comprising identifying an owner of the brand.

6. The method of claim 5, further comprising transmitting the notification to the identified owner of the brand.

7. The method of claim 1, further comprising assigning a ranking to each of the plurality of search queries based on a number of occurrences of the search queries.

8. A computing device configured to associate a brand with search queries that produce search results with malicious websites, comprising:
   a processor;
   memory in electronic communication with the processor;
   instructions stored in the memory, the instructions being executable by the processor to:
      receive a plurality of search queries entered into a search engine from a plurality of devices;
      receive, from the plurality of devices, search results produced from the plurality of search queries;
      compare the search results to a list of known malicious websites in order to identify candidate search queries producing search results with malicious websites;
      identify commonalities among the identified candidate search queries producing search results with malicious websites;
      associate the commonalities from the search queries with a brand; and
      generate a notification regarding the association of the commonalities from the search queries with the brand.

9. The computing device of claim 8, wherein the search results comprise a list of at least one uniform resource locator (URL).

10. The computing device of claim 8, wherein the instructions are executable by the processor to
   receive the plurality of search queries over a pre-determined time period.

11. The computing device of claim 8, wherein the instructions are executable by the processor to
   receive the plurality of search queries from the plurality of devices located in a pre-determined geographical location.

12. The computing device of claim 8, wherein the instructions are executable by the processor to
   identify an owner of the brand.

13. The computing device of claim 12, wherein the instructions are executable by the processor to
   transmit the notification to the identified owner of the brand.

14. The computing device of claim 8, wherein the instructions are executable by the processor to
   assign a ranking to each of the plurality of search queries based on a number of occurrences of the search queries.

15. A computer-program product for associating a brand with search queries that produce search results with malicious websites, the computer-program product comprising a non-transitory computer-readable medium storing instructions thereon, the instructions being executable by a processor to:
   receive a plurality of search queries entered into a search engine from a plurality of devices;
   receive, from the plurality of devices, search results from the plurality of search queries;

compare the search results received to a list of known malicious websites in order to identify candidate search queries producing search results with malicious websites;
identify commonalities among the identified candidate search queries producing search results with malicious websites;
identify commonalities among the plurality of search queries received from the plurality of devices;
associate the commonalities from the search queries with a brand; and
generate a notification regarding the association of the commonalities from the search queries with the brand.

* * * * *